United States Patent
Jarvis et al.

(10) Patent No.: US 8,361,582 B2
(45) Date of Patent: Jan. 29, 2013

(54) METHOD OF JOINING TWO OR MORE SUBSTRATES WITH A SEAM

(75) Inventors: Christine W Jarvis, Six Mile, SC (US); Robert E Bennett, Westminster, SC (US); Brian Frederick, Greenville, SC (US)

(73) Assignee: Clemson University, Clemson, SC (US)

( * ) Notice: Subject to any disclaimer, the term of this patent is extended or adjusted under 35 U.S.C. 154(b) by 1069 days.

(21) Appl. No.: 11/931,971

(22) Filed: Oct. 31, 2007

(65) Prior Publication Data

US 2008/0118695 A1    May 22, 2008

Related U.S. Application Data

(62) Division of application No. 09/828,715, filed on Apr. 6, 2001, now abandoned.

(51) Int. Cl.
*B32B 3/00* (2006.01)
(52) U.S. Cl. .............. 428/57; 428/58; 428/121; 428/214
(58) Field of Classification Search .................... 428/57, 428/58, 121, 214
See application file for complete search history.

(56) References Cited

U.S. PATENT DOCUMENTS

| | | | |
|---|---|---|---|
| 2,372,632 A | 3/1945 | Webb | |
| 3,887,745 A | 6/1975 | Yoshii et al. | |
| 3,970,079 A | 7/1976 | Gaylord, Jr. | |
| 4,410,575 A | 10/1983 | Obayashi et al. | |
| 4,670,073 A | 6/1987 | Langley | |
| 4,683,593 A | 8/1987 | Langley | |
| 4,753,182 A | 6/1988 | Blackburn | |
| 4,865,903 A | 9/1989 | Adiletta | |
| 5,003,902 A | 4/1991 | Benstock et al. | |
| 5,169,697 A | 12/1992 | Langley et al. | |
| 5,568,779 A | 10/1996 | Wong | |
| 5,590,615 A | 1/1997 | Wong | |
| 5,591,521 A | 1/1997 | Arakawa et al. | |
| 5,626,947 A | 5/1997 | Hauer et al. | |
| 5,682,618 A | 11/1997 | Johnson et al. | |
| 5,713,292 A | 2/1998 | Wong | |
| 5,782,191 A | 7/1998 | Wong | |
| 5,879,493 A | 3/1999 | Johnson et al. | |
| 6,096,420 A | 8/2000 | Wilhoit et al. | |
| 2002/0011308 A1 | 1/2002 | Johnson et al. | |

FOREIGN PATENT DOCUMENTS

| | | |
|---|---|---|
| EP | 682884 B1 | 10/1998 |
| EP | 855147 B1 | 11/2000 |
| WO | WO 9731676 A2 | 9/1997 |
| WO | WO 9731676 A3 | 9/1997 |

OTHER PUBLICATIONS

Abstract of Japanese Patent No. 62148242, Jul. 2, 1987.
English language translation of Japanese Patent No. S62-148242.

*Primary Examiner* — Jane Rhee
(74) *Attorney, Agent, or Firm* — Dority & Manning, P.A.

(57) ABSTRACT

A method for joining two or more substrates with a seam is provided. The seam is formed with a thermoplastic tape that is capable of forming an adhesive bond and a physical bond with a substrate. For instance, in one embodiment, the thermoplastic tape is formed from a polyurethane film. In addition, the seam can be utilized in a flat configuration or folded into a variety of different shapes, such as in a z-shaped configuration. As a result of the present invention, it has been discovered that a seam can be formed to have improved strength without substantially sacrificing the desired functional properties of the substrate materials.

16 Claims, 5 Drawing Sheets

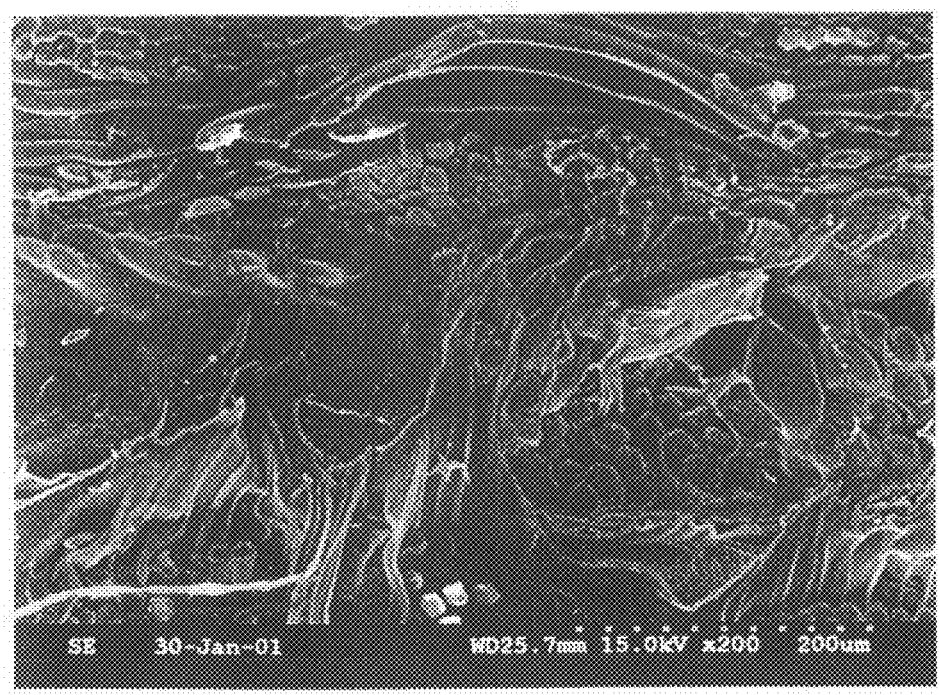
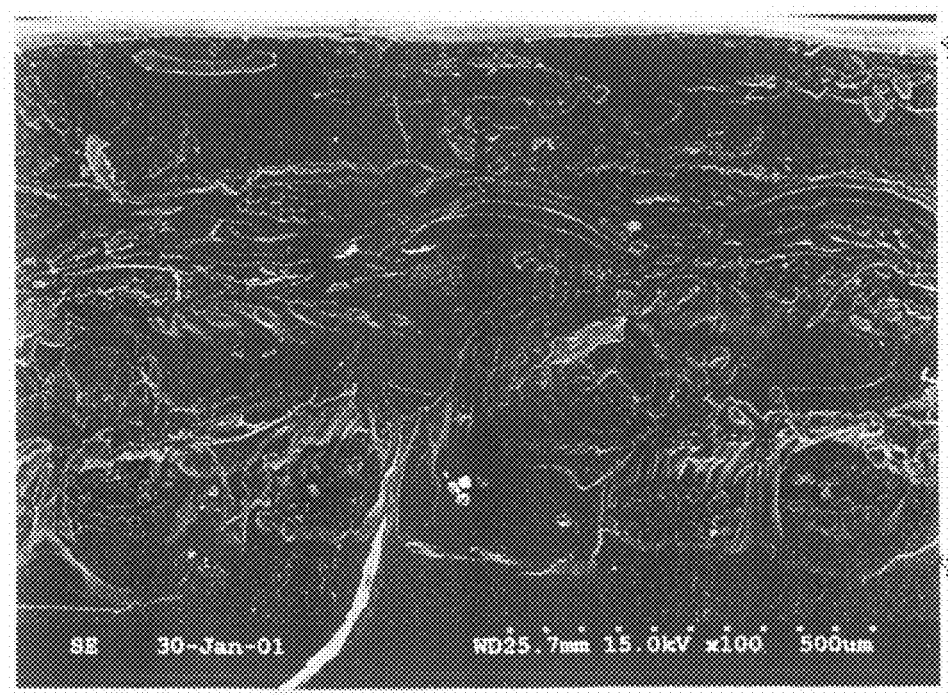

METHOD OF JOINING TWO OR MORE SUBSTRATES WITH A SEAM

CROSS REFERENCE TO RELATED APPLICATIONS

The present application is a divisional application of U.S. patent application Ser. No. 09/828,715 having a filing date of Apr. 6, 2001.

GOVERNMENT LICENSE RIGHTS

The United States Government may have rights in this disclosure as provided for by the terms of contract number DAAD 16-00-C-9292 awarded by the United States Army.

BACKGROUND OF THE INVENTION

Separate sheets of materials, such as fabrics, have been traditionally attached together for a variety of purposes using seams that were stitched or sewn into the fabrics. However, the stitching of seams into fabrics can be a relatively slow, expensive process that is undesired in some applications. Moreover, the use of sewn stitches may be completely undesired for certain types of materials, such as barrier fabrics, that require the seam area to also retain a barrier function.

Thus, in response to such problems, various other methods for attaching separate fabrics have been developed. For instance, various thermal methods that rely on the melting behavior of the fabrics have been utilized to produce seams. Specifically, the fabric and seam are heated to a certain temperature such that the materials of the fabric and seam begin to melt. Upon melting, thermal bonds are formed at the crossover points of the melted fabric and seam fibers. Other methods have also utilized adhesives, such as solvent-based liquid adhesives or glues. However, one problem with these techniques is that the seams are subject to stress fracture at low temperatures, and even at elevated temperatures, the divergent thermal melting points cause the resulting seam to be relatively weak.

In an attempt to improve strength, some methods have also utilized adhesive and/or thermal methods in conjunction with a conventional sewn seam. For instance, one such method includes sewing a seam, such as a lap seam or double-felled needle seam, between two fabrics. Thereafter, one piece of a tape is placed in its entirety only on the upper surface of the first fabric, while another piece of tape is placed in its entirely only on the lower surface of the second fabric. The tapes are then sealed under heat and pressure. Nevertheless, one problem with such a process is that it is relatively inefficient and costly. In particular, during manufacturing, a seam must be first sewn into the substrates and then the tapes are applied. Such multiple tasks add manufacturing costs and raw material costs. In addition, holes are often formed in the substrate by the needles during sewing. Although the tape can sometimes seal the needle holes, it is still possible that the fill-in might be incomplete. Unfortunately, the presence of any holes in a substrate can be undesirable for certain applications, such as when the substrate is used as a barrier fabric.

As such, a need currently exists for an improved method of forming a relatively strong seam between two or materials.

SUMMARY OF THE INVENTION

In accordance with one embodiment of the present invention, a method of forming a seam between substrates (e.g., fabrics) is provided. For example, the method includes providing a first substrate and a second substrate. Each substrate has an upper surface and a lower surface that define at least one edge.

A first tape portion is placed adjacent to the first substrate such that the tape portion is placed in operative communication with the upper and lower surfaces of the first substrate. Further, a second tape portion is placed adjacent to the second substrate such that the second tape portion is placed in operative communication with the upper and lower surfaces of the second substrate. Each tape portion comprises a thermoplastic material that is melt-flowable when subjected to a certain amount of heat and pressure. For example, in one embodiment, the tape contains polyurethane.

In addition, the method also includes forming an adhesive bond and a physical bond between the first tape portion and the first substrate and between the second tape portion the second substrate. An "adhesive bond" generally refers to a bond that results from attractive forces between two or more materials. For instance, adhesive bonds may sometimes result from "dipole-dipole forces" between materials, which are a type of van der Waals force that occurs upon the interaction of the dipole moments of two polar molecules. In addition, a "physical bond" can refer to the physical intermingling of a material within the interstices of a substrate.

In some embodiments, the method can also include heating the first tape portion and/or the second tape portion to a certain predetermined temperature. For example, in some embodiments, the first tape portion and/or the second tape portion can be heated to a temperature of between about 10° C. below the thermal melting point of the thermoplastic material to about 50° C. above the thermoplastic material. Besides being heated, the first and/or second tape portions can also be subjected to a certain pressure. For example, in some embodiments, the first and/or second tape portions can be subjected to a pressure of between about 40 pounds per square inch to about 120 pounds per square inch.

If desired, the tape portions may also be folded or shaped before and/or after being placed adjacent to the first and second substrates. For example, in one embodiment, the tape portions can be folded into a z-shaped configuration.

In accordance with another embodiment of the present invention, a seam is provided that includes a first substrate and a second substrate. Each substrate has an upper surface and a lower surface that defines at least one edge. In addition, the seam comprises a first tape portion and a second tape portion that are adhesively and physically bonded to the first substrate and the second substrate, respectively.

Other features and aspects of the present invention are discussed in greater detail below.

BRIEF DESCRIPTION OF THE DRAWINGS

FIG. 6 are SEM photomicrographs of a seam formed according to one embodiment of the present invention in which FIG. 6A is a seam formed by a polyurethane bilayer thermoplastic tape bonded at 380° F., shown at a magnification of ×100, and FIG. 6B is the seam shown in FIG. 6A at a magnification of ×200.

Figure 1:
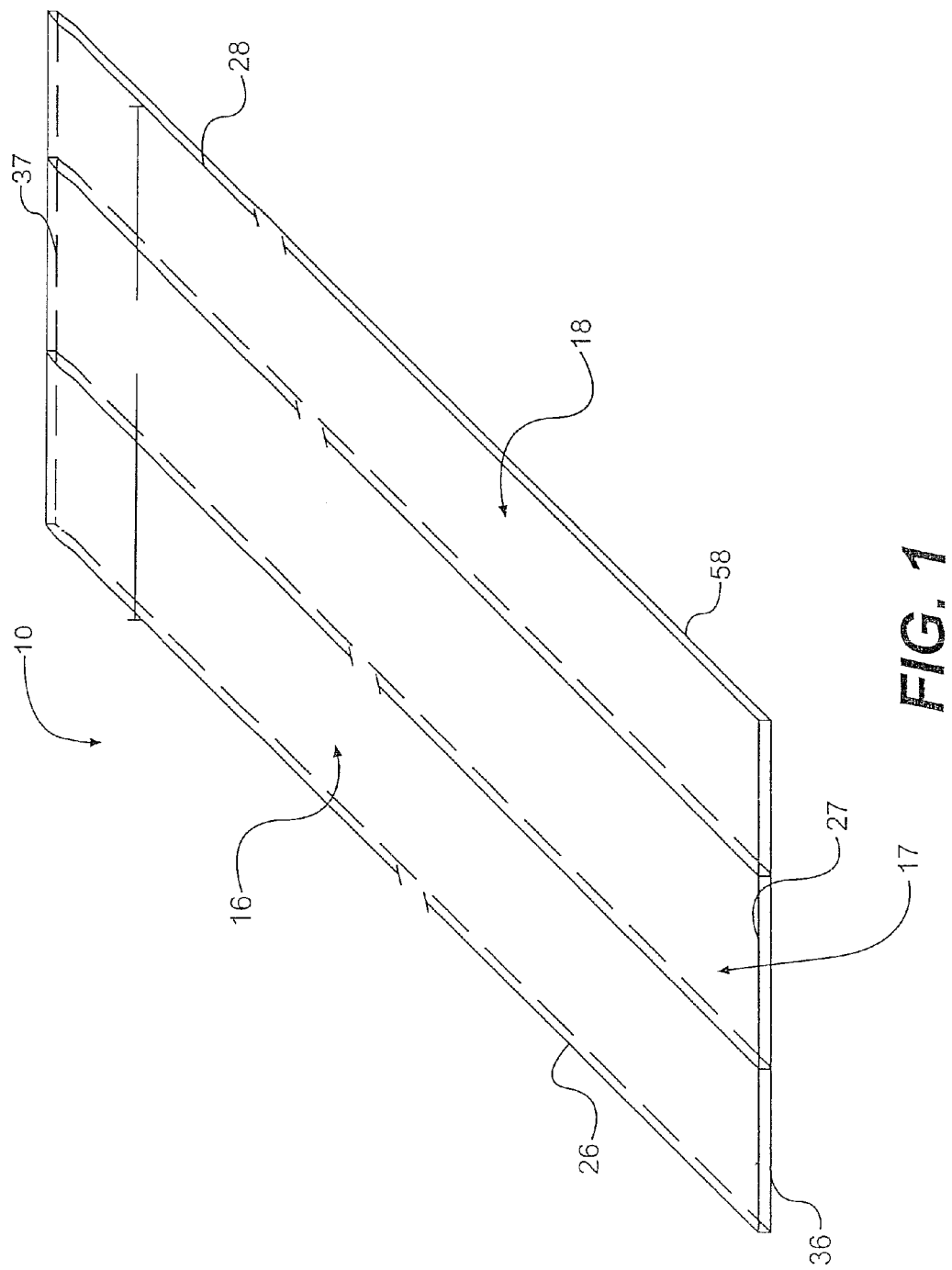
FIG. 1 is a perspective view of one embodiment of a tape that can be used to form a seam in accordance with the present invention.

Repeat use of reference characters in the present specification and drawings are intended to represent same or analogous features or elements.

Detailed Description of Representative Embodiments

It is to be understood by one of ordinary skill in the art that the present discussion is a description of exemplary embodiments only, and is not intended as limiting the broader aspects of the present invention, which broader aspects are embodied in the exemplary construction.

In general, the present invention is directed to a method of joining two or more substrates with a thermoplastic tape. For example, a thermoplastic tape used in the present invention is capable of forming both an adhesive bond and a physical bond with a substrate. As a result, it has been discovered that the tape can form a seam between two substrates that has excellent tensile strength in comparison to conventional seams. In addition, such enhanced tensile strength can be achieved without having a substantial adverse affect on the functional properties of the substrates (e.g., barrier properties, etc.).

A variety of substrates can generally be joined with a thermoplastic tape in accordance with the present invention. For instance, some substrates that can be utilized include fabrics, such as woven, knitted, nonwoven fabrics, or composites thereof. When utilized, the fabrics may contain synthetic fibers, natural fibers, or blends thereof. In addition, other materials may also be utilized, such as elastomeric materials (natural or synthetic), paper-based materials (e.g., natural pulp or a blend of natural and synthetic short fibers), extruded films (e.g., films of thermoplastic or thermoplastic elastomeric polymers), etc.

The substrates can also have any desired shape, size, or configuration. For example, a substrate may be provided as a flat sheet of material having linear and/or nonlinear edges. In some instances, the substrates may also have extended lengths and/or substantially parallel longitudinal edges. If desired, the edges of one or more of the substrates may be finished by cutting and/or by a selvage. In some embodiments, one or more of surfaces of a substrate may also be coated or surface-treated with a treatment, such as a silicon treatment, to alter or enhance the surface properties or barrier performance of the materials. It should be understood that the substrates described above are only examples of some substrates that can be utilized, and that the present invention is not limited to the use of any particular substrate.

As mentioned above, a seam can be formed between two or more substrates utilizing a thermoplastic tape. In general, any of a variety of thermoplastic materials can be utilized in the thermoplastic tape of the present invention. For instance, some examples of suitable thermoplastic materials that can be used in the present invention include, but are not limited to, polyurethane, polyethylene, polypropylene, copolyesters, and the like. In one embodiment, for example, the thermoplastic tape is formed from an extruded polyurethane film. The thermal melting point of the thermoplastic materials used to form the thermoplastic tape may be the same or different than the materials used to form the substrate(s). For example, in some instances, the substrate materials have a thermal melting temperature that is greater than the thermal melting temperature of the tape material(s) so that the substrate substantially retains its structure and functional properties upon the application of heat and pressure.

In many instances, the tape may also contain more than one type of thermoplastic material. For example, the tape can be a composite of a thermoplastic polymer that is blended or layered with another thermoplastic polymer. In one embodiment, for instance, the tape contains a blend of at least two thermoplastic polymers that have thermal melting points that differ by at least about 5° C. In another embodiment, the tape is a layered composite material such that one portion of the tape is formed from a first thermoplastic polymer component, while another portion of the tape is formed from a second thermoplastic polymer component. For example, up to 75% of the tape width can be formed from the first thermoplastic polymer component, while the remainder of the tape width can be formed from the second thermoplastic polymer component. Each polymer component may contain one or more types of thermoplastic polymers.

Other materials may also be utilized in conjunction with the thermoplastic polymer(s) to form the thermoplastic tape of the present invention. For example, in some embodiments, various materials can be coated onto one or more surfaces of the tape and/or along the edges of the tape to enhance the ability of the tape to bond to one or more substrates. Some examples of additional materials that can be utilized in conjunction with a thermoplastic polymer include, but are not limited to, solvent-based adhesives, discrete raised beads of an adhesive material, etc.

Figure 2:
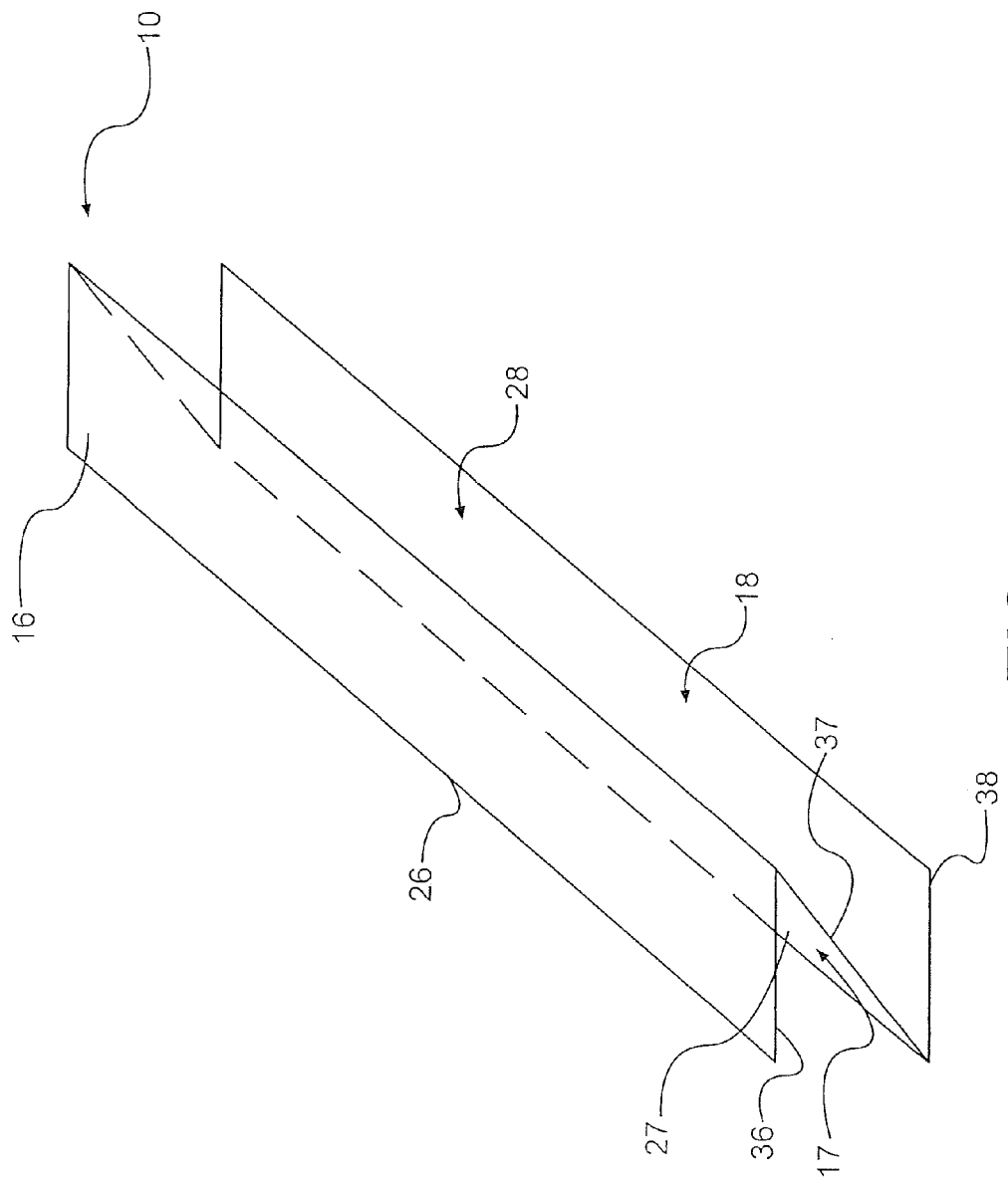
FIG. 2 is a perspective view of one embodiment of a folded tape used to form a seam in accordance with the present invention.

In some embodiments, the tape may be utilized in a flat configuration, while in other embodiments, the tape may be utilized in a folded or shaped configuration. For example, referring to FIGS. 2-3, one embodiment of the present invention is illustrated in which a thermoplastic tape 10 is shown folded in a "z-shaped configuration" to form a first section 16, a second section 17, and a third section 18. The sections 16, 17, and 18 may be a single continuous strip or two or more separate strips. When formed from separate strips, such strips may be unattached (e.g., two or more U-shaped sections) or attached using conventional techniques. Moreover, the separate strips, when utilized, may be formed from the same or different materials. It should be understood that the tape 10 need not possess three sections, but can possess any number of sections desired.

Figure 3:
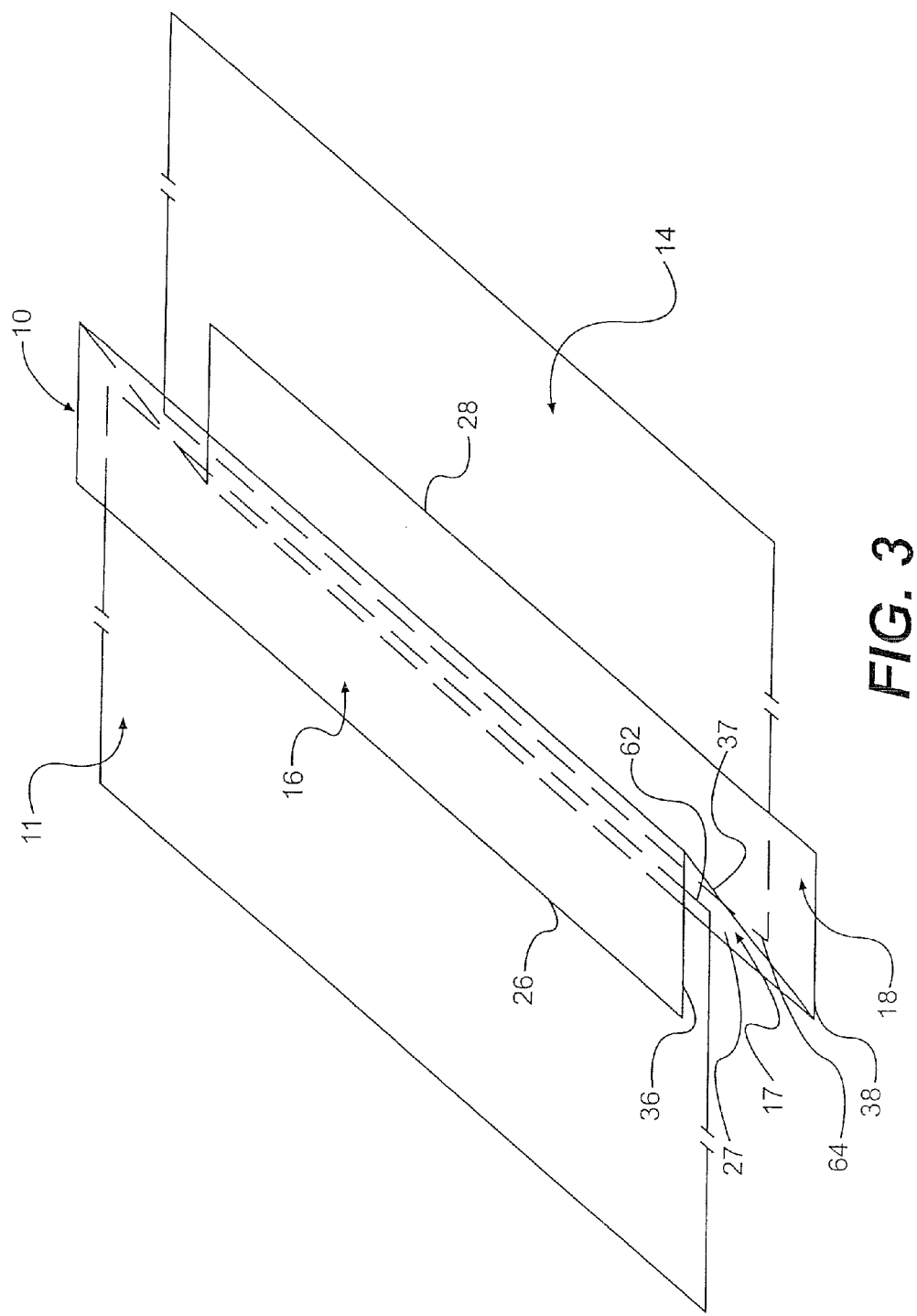
FIG. 3 is a perspective view illustrating one embodiment of the present invention for forming a seam between two substrates using the tape of FIG. 2.

Regardless of the particular method used to construct the section(s), in the embodiment of the z-shaped configuration illustrated in FIG. 3, the lower surface 36 of the first section 16 faces the upper surface 27 of the second section 17, while the lower surface 37 of the second section 17 faces the upper surface 28 of the third section 18. The tape 10 may generally be shaped or folded, such as described above, using a variety of different techniques. For example, in some embodiments, a thermoplastic material can be extruded onto a forming surface that has the shape of the desired fold. Thus, as the polymer is deposited onto the forming surface, it naturally assumes the shape of the forming surface. In other embodiments, the thermoplastic material can be extruded as a flat ribbon and then folded through the use of a series of guide bars. Once folded, light heat and pressure can be applied to set the folded shape.

In accordance with the present invention, once the particular thermoplastic tape and substrates are provided, they are then placed into operative communication such that the tape can form a seam between the substrates. In this regard, various embodiments for placing the thermoplastic tape into operative communication with the substrates to form a seam will now be described in more detail. It should be understood, however, that the embodiments discussed below are only intended to illustrate some examples of the present invention, and that other embodiments and techniques for placing a thermoplastic tape into operative communication with one or more substrates are also contemplated by the present invention.

For example, referring to FIG. 3, one embodiment of a method of forming a seam between two substrates and a tape folded in a z-shaped configuration is illustrated. As shown, a first substrate 11 is positioned between the lower surface 36 of the first section 16 of the tape 10 and the upper surface 27 of the second section 17 of the tape 10. In addition, the second substrate 14 is positioned between the lower surface 37 of the second section 17 of the tape 10 and the upper surface 28 of the third section 18 of the tape 10. In most embodiments, the substrates are positioned such that the edges 64 and 62 are in an overlapped position, such as shown in FIG. 3. As a result, the tape 10 can be more readily placed into contact with the upper and lower surfaces of each of the substrates 11 and 14.

In some embodiments, the tape 10 may also be placed into operative communication with the substrates 11 and 14 before the tape 10 is shaped or folded. For example, in one embodiment of the present invention, a flat thermoplastic tape 10 (See FIG. 1) is placed in communication with two substrates 11 and 14 by overlapping the tape 10 over certain portions of the substrates 11 and 14. Thereafter, heat and pressure can be applied to lightly bond the flat tape 10 to the substrates 11 and 14. Once lightly bonded, a series of guide bars can then be utilized to shape or fold the tape 10 as desired.

After the substrates 11 and 14 have been placed in communication with the tape 10, such as described above, they can then be supplied to a conventional seam assembly device (not shown) where heat and pressure are applied to seal the materials and form the desired seam. Although not required, heat and pressure are typically applied simultaneously. In general, any of a variety of conventional methods for applying heat and pressure to a material can be utilized in the present invention. For instance, some examples of suitable methods for applying heat and pressure include, but are not limited to, the use of heated nip rolls, hot calendering techniques, ultrasonic welding techniques, the use of lasers in conjunction with nip rolls, the use of certain radio frequencies in conjunction with nip rolls, combinations thereof, and the like.

The particular pressure and temperature utilized can vary depending on a variety of factors, such as the materials utilized for the tape and/or substrate(s), the size and shape of the tape and/or substrate(s), the desired seam width, the desired strength of the seam, the type of seam construction, etc. For example, in most instances, the seam can be formed at a temperature that ranges from about 10° C. less than the thermal melting temperature of the thermoplastic material of the tape 10 having the lowest thermal melting temperature, up to a temperature of about 50° C. above such thermal melting temperature. For example, in one embodiment, a bilayer polyurethane tape having a thermal melting point of 147° C. can be heated at a processing temperature of between about 170° C. to about 195° C. In addition, the seam can be formed at a processing pressure between about 40 pounds per square inch to about 120 pounds per square inch. Thus, in the embodiment shown in FIG. 3, pressure can be applied to compress the z-shaped configuration of the tape 10 by applying a compressive force to the first section 16 and/or the third section 18. In one embodiment, for instance, the materials can be hand pressed at a temperature of about 110° C. for about 5 seconds. In another embodiment, the materials can be hand pressed at a temperature of between about 170° C. to about 195° C. for 10 seconds.

Once heat and pressure have been applied, the tape 10 can form a seam with the substrates 11 and 14. As described above, the seam can have any of a variety of configurations and constructions. For example, referring to FIG. 4, one embodiment of a seam 70 is shown in which the seam 70 is defined by the region of the tape 10 positioned between the substrates 11 and 14.

In accordance with the present invention, it has been discovered that the seam formed between the thermoplastic tape and the substrates utilizes both "adhesive bonds" and "physical bonds" to enhance the strength of the seam. An "adhesive bond" generally refers to a bond that results from attractive forces between two or more materials. For instance, adhesive bonds may sometimes result from "dipole-dipole forces" between materials, which are a type of van der Waals force that occurs upon the interaction of the dipole moments of two polar molecules.

Besides forming an adhesive bond with the substrates, however, it has also been discovered that the thermoplastic tape can also form a "physical bond". For example, in one embodiment, after being heated to a certain temperature, at least a portion of the first section 16 and/or the second section 17 of the tape 10 can be softened or melted such that the portion becomes relatively melt-flowable. Moreover, upon being subjected to a certain pressure, the polymer of such melt-flowable portions of the tape 10 can be forced between the interstices of the topography of the substrates 11 and 14. Thereafter, the seam is allowed to cool, whereby the melt-flowable portions solidify within the interstices of the substrates 11 and 14 to form a contiguous "physical bond" therewith. For example, referring to FIGS. 6A-6B, certain melt-flowable portions 88 of a polyurethane bilayer tape 10 are shown in physical contact with two substrates 11 and 14.

Thus, because the tape is capable of forming adhesive and physical bonds with one or more substrates, the strength of the resulting seam can be significantly enhanced. In particular, it has been discovered that seams formed according to the present invention can attach substrates without the use of conventional needle stitching, but can nevertheless possess a strength that approximates the strength obtained using conventional stitching. However, it should be understood that conventional stitching may be used in conjunction with the seam of the present invention if desired.

Moreover, it should also be understood that, in some instances, the tape 10 may only form a small amount of physical or adhesive bonds with a particular substrate. In particular, one unique aspect of the present invention is the ability to form a seam between materials that may not readily able to form adhesive or physical bonds with the thermoplastic tape. In such instances, it may be desired to control certain aspects of seam formation in order to better control the extent of adhesive bonding and/or physical bonding.

For example, in some embodiments, the processing temperatures and/or pressures can be selected to favor certain types of bonding. For instance, a lower processing temperature can be utilized to produce a seam that is bonded to the substrates 11 and 14 primarily through adhesive bonding. Specifically, at lower processing temperatures, a smaller amount of the thermoplastic polymer(s) used in forming the tape 10 will become melt-flowable. As a result, the tape 10 physically bonds to the substrates 11 and 14 to a lesser extent. On the other hand, at higher processing temperatures, a greater amount of the thermoplastic polymer(s) used in forming the tape 10 will become melt-flowable, thereby increasing the extent of physical bonding between the tape 10 and the substrates 11 and 14.

In addition, besides varying the processing conditions, the particular tape and/or substrate construction can also affect the nature of bonding between the tape 10 and the substrates 11 and 14. For example, in certain embodiments, the substrates 11 and/or 14 may be formed from a non-fibrous or non-porous material, such as a butyl rubber sheet. In such instances, it may be desired to increase the surface area of the substrate to facilitate physical bonding therewith. For example, the edge of the substrate can be cut in a non-linear pattern to increase its surface area. Such non-linear patterns can be provided by a "pinking" saw-tooth shear cut or patterns created by a knife or die cutter (e.g., ultrasonic die cutter). Furthermore, etching (e.g., plasma etching) can be utilized to create a three-dimensional topography on one or more surfaces of a substrate. Such a three-dimensional topography can provide an "anchor" for the melt-flowable polymer during processing to enhance physical bonding of the tape to the substrate.

Figure 5:
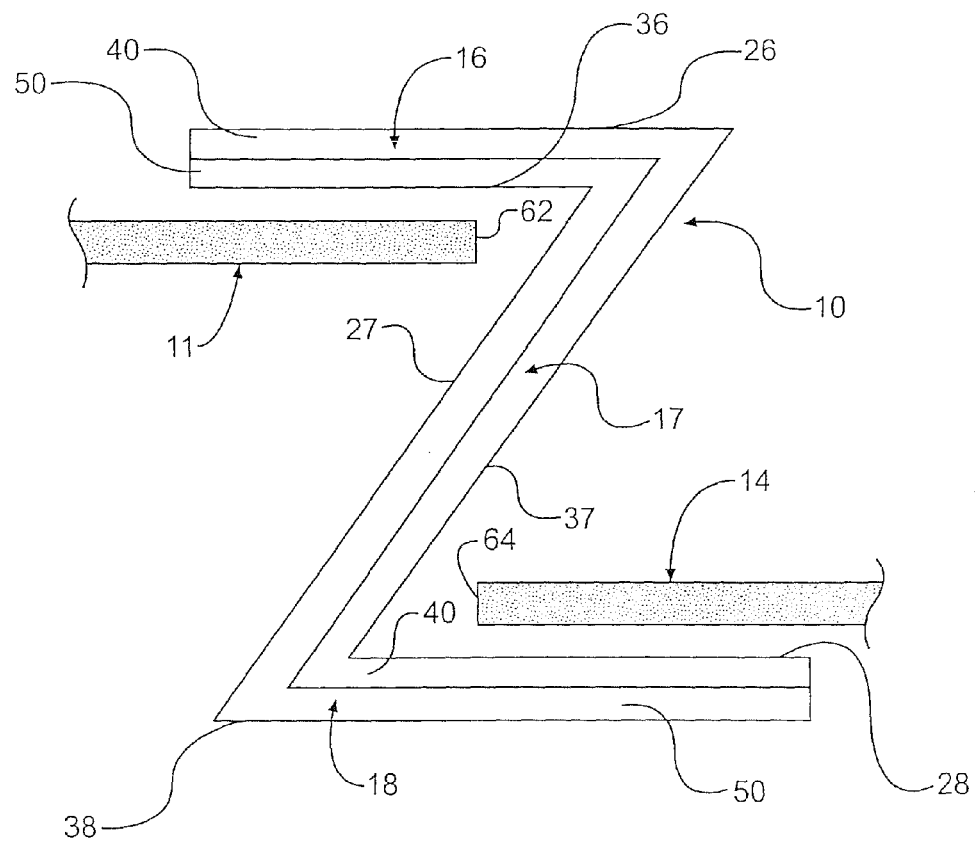
FIG. 5 illustrates one embodiment of a multi-layered tape used form a seam in accordance with the present invention.

In addition to varying the construction of the substrate(s), the construction of the thermoplastic tape may also be varied to control the extent of adhesive and physical bonding. For instance, in some embodiments, a multi-layer thermoplastic tape (e.g., two layers, three layers, etc.) can be utilized to vary the extent of adhesive and physical bonding. Referring to FIG. 5, for example, one embodiment a two-layer thermoplastic tape 10 is shown in which a first layer 40 forms the upper surface 26 of the first section 16 of the tape 10 and a second layer 50 forms the lower surface 36 of the first section 16 of the tape 10.

To alter the extent of adhesive and physical bonding, the materials used in forming the layers 40 and 50 can be preselected to result in a certain type of bond. For example, in one embodiment, the layer 40 can be formed from a first material that has a certain melting point, while the layer 50 can be formed from a second material that has a melting point that is greater than the melting point of the first material. Thus, certain portions of the tape 10 can bond to a substrate primarily through adhesive bonding, while other portions of the tape 10 can bond to a substrate primarily through physical bonding. Specifically, in this embodiment, the lower surface 36 of the first section 16 and the upper surface 27 of the second section 17 can bond to the substrate 11 primarily through adhesive bonding, while the lower surface 37 of the second section 17 and the upper surface 28 of the third section 18 can bond to the substrate 14 primarily through physical bonding.

Such preferential bonding can be particularly useful when the materials that form the substrate 11 differ from the materials that form the substrate 14. For instance, in some embodiments, the substrate 14 may be relatively "adhesively" incompatible with the tape 10. Moreover, in other embodiments, the substrate 11 may have a thermal melting point that is relatively incompatible with the thermal melting point of the tape 10. Nevertheless, because the tape 10 is capable of adhesive and physical bonding, it can still form bonds having excellent strength with both the substrates 11 and 14.

In addition to being able to form a strong seam between two substrates, the thermoplastic tape used in the present invention can also protect one or more edges of the substrates. In particular, as shown in FIG. 3, the tape 10 can substantially cover the edge 62 of the substrate 11 and the edge 64 of substrate 14 so that, upon the application of heat and pressure, the tape 10 forms a seal over the edges 62 and 64. This seal can prevent various objects from abrading or picking at the edges of the substrates, which could eventually lead to the degradation of the bond between the substrates.

The present invention may be better understood with reference to the following examples.

EXAMPLE 1

The ability of two substrates to be joined with a thermoplastic tape in accordance with one embodiment of the present invention was demonstrated. Two substrates were obtained from the U.S. Army Soldier Systems Center in Natick, Mass. The substrates were prepared from a sheet material specified by Military Specification MIL-C-13621. Specifically, the sheet contained three layers and had an overall basis weight of between 370 to 460 grams per square meter (gsm). The inner layer was a scrim of nylon fabric having a twill weave. In addition, the outer layers were formed from butyl rubber. The edges of the substrates were cut with pinking shears prior to fabricating the seam.

The thermoplastic tape utilized was a modified polyurethane two-layer film available under the name ST-52 from Bemis Associates, Inc. of Shirley, Mass. In particular, one layer contained a polyurethane adhesive and had a thickness of 0.064 millimeters, while the other layer contained a polyurethane barrier material and had a thickness of 0.101 millimeters. The melting temperature of the adhesive layer was 82° C. and the melting temperature of the barrier layer was 147° C. The tape had a width of 22.2 millimeters.

To form the seam, the thermoplastic tape was initially placed into communication with the substrates to form a seam gauge, which was defined by an overlap of 6.35 mm of the fabric edges. The tails of the tape extended 1.6 mm beyond the fabric edges on the upper and lower surfaces of the seam. One edge of the thermoplastic tape was pre-attached to the edge of one of the fabric pieces using a Sonobond Model SM8000 Ultrasonic Sewing Machine, available from Sonobond Ultrasonics of West Chester, Pa. The sewing machine was set with a horn height of 2.3 millimeters, an amplitude setting of 1.5, and a residence time of 1 second. Tack points were set approximately 6 mm apart.

Figure 4:
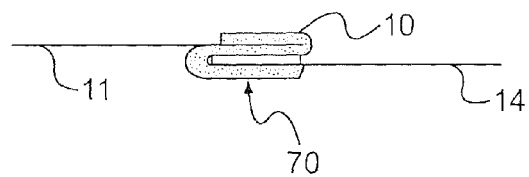
FIG. 4 illustrates one embodiment of a seam formed according to the present invention.

The second fabric piece was pre-attached to the thermoplastic tape in a similar manner. The tape was then folded to place the fabric edges in an overlapping position, such as shown in FIG. 4. A flat buck press was then used to bond the materials. In particular, the press was utilized at temperatures of 170° C. and 195° C., a pressure of about 5.6 kg/cm², and for a residence time of about 10 seconds.

EXAMPLE 2

The ability of two substrates to be joined with a thermoplastic tape in accordance with one embodiment of the present invention was demonstrated. Two substrates were obtained from the U.S. Army Soldier Systems Center in Natick, Mass. The substrates were prepared from a tent shelter fabric as described in Military Specification MIL-PRF-44103D, Class 2, Grade B. Specifically, the fabric was a coated, woven nylon with a desert tan camouflage print.

The thermoplastic tape utilized was a modified polyurethane two-layer film available under the name ST-52 from Bemis Associates, Inc. of Shirley, Mass. In particular, one layer contained a polyurethane adhesive and had a thickness of 0.064 millimeters, while the other layer contained a polyurethane barrier material and had a thickness of 0.101 millimeters. The melting temperature of the adhesive layer was 82° C. and the melting temperature of the barrier layer was 147° C. The tape had a width of 22.2 millimeters.

The seam was formed as described in Example 1. In addition, the Grab Tensile Strength of three samples of the fabric and seam were tested according to ASTM D-5034. The fabric failed at loads of 155 to 160 kg. The average Grab Tensile Strength of the three seam tests was 150.98 kg.

EXAMPLE 3

Example 3 was prepared according to Example 2, except that the seam gauge was 3.175 millimeters and the thermoplastic tape had a width of 19 millimeters. Three sample seams were again tested for Grab Tensile Strength. For one of the seams, the fabric failed before the seam, i.e., at a load of 157.4 kg. The other two seams failed at loads of 134.3 kg and 136.3 kg.

EXAMPLE 4

The ability of two substrates to be joined with a thermoplastic tape in accordance with one embodiment of the present invention was demonstrated. Two substrates were obtained from the U.S. Army Soldier Systems Center in Natick, Mass. The substrates were prepared from a three-layer fabric as described in Military Specification MIL-C-44187. Specifically, this fabric was constructed of a plain weave nylon fabric having a basis weight between 88 to 102 grams per square meter (gsm), laminated to a polytetrafluoroethylene (PTFE) microporous film having a basis weight of between 10 to 24 gsm. The backing of the fabric was a nylon tricot knit fabric backing having a basis weight of between 34 to 62 gsm.

The thermoplastic tape utilized was a tape formed from three separate strips of a modified polyurethane two-layer film available under the name ST-52 from Bemis Associates, Inc. of Shirley, Mass. In particular, one layer contained a polyurethane adhesive and had a thickness of 0.064 millimeters, while the other layer contained a polyurethane barrier material and had a thickness of 0.101 millimeters. The melting temperature of the adhesive layer was 82° C. and the melting temperature of the barrier layer was 147° C. The resulting tape had a width of 7 millimeters.

The seam was formed and as described in Example 2. The Grab Tensile and Peel Strength of the fabric and the seam were tested according to ASTM D-5034 and ASTM D-2724 (sections 14-15), respectively. The average Grab Tensile Strength of the three seam tests was 114 kg and the average Grab Peel Strength for these seams was 2.28 kg.

EXAMPLE 5

For purposes of comparison, a conventional lap seam having a seam gauge of 6.3 millimeters was utilized to attach the two substrates described in Example 4. After sewing the seam through the substrates, two strips of thermoplastic tape were also utilized. In particular, one strip of thermoplastic tape was placed in its entirety only on the upper surface of one substrate to adhere one end of the seam thereto. The other strip was placed in its entirety only on the lower surface of the other substrate to adhere the other end the sewn seam thereto. The strips of tape were then heated and pressed to set the tape.

The average Grab Tensile of these seams was 78 kg and the average Peel Strength of these seams was 1.53 kg.

EXAMPLE 6

For purposes of comparison, a conventional double-felled needle sewn seam was utilized to attach the two substrates described in Example 4. The average Grab Tensile of these seams was 85.1 kg and the average Peel Strength of these seams was 4.03 kg.

A summary of the results obtained in Examples 2 through 6 is provided below in Table I.

TABLE I

Summary of Examples

| Ex. # | Substrate | Seam | Avg. Seam Grab Tensile (kg) | Avg. Seam Peel Strength (kg) |
|---|---|---|---|---|
| 2 | Coated Woven Nylon | -z fold | 150.98 | — |
| 3 | Coated Woven Nylon | -z fold | 135.3 | — |
| 4 | Three-layer | -z fold | 114 | 2.28 |
| 5 | Three-layer | Lap | 78 | 1.53 |
| 6 | Three-layer | Double needle | 85.1 | 4.03 |

Thus, as shown from Table I, a seam formed according to the present invention can provide enhanced bonding strength in comparison to seams formed according to conventional techniques. In particular, the ability of the thermoplastic tape to form physical and adhesive bonds can provide a seam of unexpected strength and durability. Such seams can be utilized in a wide variety of applications. For example, the seams may be useful in joining barrier materials, particularly when the barrier function must be maintained in the seam area. Examples of such barrier materials include protective apparel for biological exposure areas, chemical warfare, and underwater diving suits. Further, because the seams of the present invention do not rely upon needle stitching, they may have enhanced utility in applications requiring controlled air porosity, such as in parachute constructions. Moreover, other applications in which the seams may be useful include tents, military uniforms, fabric-covered air ships (e.g., blimps), and the like.

These and other modifications and variations of the present invention may be practiced by those of ordinary skill in the art, without departing from the spirit and scope of the present invention, which is set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A multilayer stitchless seam comprising a connecting bond formed between at least a first substrate and a second substrate and at least a first tape portion, a second tape portion, and a third tape portion, wherein the stitchless seam is a welded seam having a seam width, wherein the first substrate comprises a surface that is bonded to the first tape portion across the seam width plus a first additional width such that the width of the first tape portion that is bonded to the first substrate surface is greater than the seam width, wherein the first additional width is at least 1.6 millimeters.

2. The multilayer stitchless seam of claim 1, wherein the first additional width is greater than the seam width.

3. The multilayer stitchless seam of claim 1, wherein at least four areas of the first and second substrates are bonded in a cross-sectional area of the seam and wherein the seam has a strength greater than a double felled needle sewn seam made from the same substrates.

4. The multilayer stitchless seam of claim 1, wherein at least four areas of the first and second substrates are bonded in a cross-sectional area of the seam and wherein the tensile grab strength is at least about 85 kg.

5. The multilayer stitchless seam of claim 1, wherein the tensile grab strength is at least about 114 kg.

6. The multilayer stitchless seam of claim 1, wherein the tensile grab strength is at least 135 about kg.

7. The multilayer stitchless seam of claim 1, wherein the tensile grab strength is at least about 150 kg.

8. The multilayer stitchless seam of claim 1, wherein at least two of the tape portions are contiguous.

9. The multilayer stitchless seam of claim 1, wherein at least two of said tape portions and said substrate portions are the same materials.

10. The multilayer stitchless seam of claim 1, wherein the first substrate and the second substrate are different materials.

11. The multilayer stitchless seam of claim 1, wherein at least one of the substrate portions comprises a barrier layer.

12. The multilayer stitchless seam of claim 1, wherein at least one of the substrate portions comprises a fabric.

13. The multilayer stitchless seam of claim 1, wherein both the first substrate portion and the second substrate portion comprise a fabric.

14. The multilayer stitchless seam of claim 1, wherein the seam is a welded seam.

15. The multilayer stitchless seam of claim 1, the seam further comprising a third substrate.

16. The multilayer stitchless seam of claim 1, wherein the first substrate further comprises a second surface that opposes the first surface, and the second substrate comprises first and second opposing surfaces, the second surface of the first substrate being bonded to the second tape portion, the first surface of the second substrate being bonded to the second tape portion, and the second surface of the second substrate being bonded to the third tape portion.

* * * * *